UNITED STATES PATENT OFFICE.

CASSIUS C. PECK, OF NEW YORK, N. Y.

PROCESS OF MAKING FERTILIZERS.

SPECIFICATION forming part of Letters Patent No. 409,230, dated August 20, 1889.

Application filed February 8, 1889. Serial No. 299,176. (No specimens.)

*To all whom it may concern:*

Be it known that I, CASSIUS C. PECK, a citizen of the United States, residing in the city, county, and State of New York, have invented a certain new and useful Process of Manufacturing Fertilizers, of which the following is a specification.

In rendering the fat of cattle and swine, as conducted on a large scale by slaughter-houses and in bone-boiling establishments, there results three distinct layers or strata composed of substances which differ in specific gravity. The uppermost layer is composed of fatty or oleaginous substances, the middle layer of water, usually containing from five to ten per cent. of solid matter in solution and suspension. The bottom layer is mostly composed of solid particles—such as fibers and portions of meat—which are specifically heavier than water. It is the middle or watery layer, the solid constituents of which are rich in nitrogen in the form of ammonia, to which my process relates. It has been customary to waste this by-product of fat and bone-rendering, although it contains a sufficient amount of fertilizing element to warrant evaporating the water and reducing the solid constituents to a dry state. In attempts to carry out such a plan of concentration practically much difficulty has been experienced in preserving the dried product in solid form, on account of its deliquescent nature or tendency to absorb moisture. Many attempts have been made to change the hygroscopic nature of the material, as by admixture of sulphate of iron or of caustic lime after evaporating the tank-water, so that the residuum contains only about twenty-five per cent. of moisture, and then finishing the drying in steam-heated ovens or driers. The cost of such methods and the loss of ammonia attending them have prevented their general or extended use.

My process obviates these difficulties by reducing the time and cost of the operation and preserving nearly all the ammonia originally contained in the material.

The several steps in the process are as follows: Tank-water as it comes from rendering-tanks is evaporated by any suitable apparatus. I prefer in this connection to employ vacuum apparatus, on account of keeping the temperature low and avoiding loss of ammonia, which occurs with the use of high temperatures. Where the tank-water has been so far concentrated that the residuum contains only about twenty-five per cent. of moisture, and is therefore thickened to about the consistency of molasses, it is run into a mixing tank or tub, preferably circular in form and provided with a central rotating shaft, to which shaft are fastened one or more arms having teeth for mixing the aforesaid residuum or "stick," as it is termed, with a proper amount of infusorial earth. The special feature of my invention is the employment of infusorial earth for absorbing the remaining moisture contained by the stick. A sufficient amount of infusorial earth may be employed to take up the moisture contained by the stick and retain the whole mass of the mixture in a sufficiently dry condition; or a less amount of infusorial earth may be used and the mixture subsequently treated in a vacuum-pan provided with powerful stirring apparatus—such as the Frenzel vacuum-pan—for removing the remaining moisture and leaving the mass in a dry condition, in which condition it is subsequently kept by the presence of the infusorial earth. This latter course is the one which I prefer, as requiring the least amount of foreign matter to be mixed with the stick. The cost of treating the mixture in a vacuum-pan is counterbalanced by the less amount of infusorial earth required, while the product has a greater value for a given weight when the least amount of infusorial earth is used.

After admixture of the earth, as described, the resulting product is ready for shipment in bags or otherwise.

The use of this material is principally for mixing with other fertilizers, and its market value is based upon the number of units of nitrogen in the form of ammonia which it contains. It is therefore of the highest importance to preserve from loss the whole of the ammonia contained in the tank-waters. My process accomplishes this end by avoiding the use of high temperatures and employing a substance neutral to the stick, or which does not act chemically upon the stick for taking up the final percentage of moisture and preventing the finished product from subsequently assuming a pasty condition. Other processes, as referred to, not only involve a larger amount of labor and cost in handling, grinding, &c., but also require higher temperature for final drying, the result being a more costly and less valuable product.

From the great capacity of infusorial earth for absorbing moisture only a small amount of this substance is required, especially when the mixture is dried in a vacuum-pan, as described. Thus twelve and one-half pounds of infusorial earth added to one hundred pounds of stick containing about twenty-five per cent. of water will, when thoroughly mixed, bring the whole mass into a dry and granular condition, well suited for shipment or storage. If the mixture is to be dried after addition of the infusorial earth, from one-quarter to one-half the above-named amount is all that is needed to retain the desiccated compound in a permanently dry state under ordinary conditions.

I am aware that charcoal, lime, and various chemicals have been employed for mixing with semi-liquid tank-water for the special object of preventing subsequent deliquescence in the dried article or commercial product. None of these methods, however, are the equivalent of my invention, since infusorial earth has so much greater absorbent power as to require much less of it than either charcoal or lime, and thus produces a more concentrated fertilizer at less cost, while as regards the sulphate of iron or other chemicals the cost of my process is very materially less and the product of higher value.

What I claim as my invention, and desire to secure by Letters Patent, is—

1. The process herein described of manufacturing fertilizing material, consisting in concentrating the water resulting from rendering processes to a semi-liquid condition, and then mixing it with infusorial earth for the purpose and substantially in the manner described.

2. The process herein described of manufacturing fertilizing material, consisting in concentrating the water resulting from rendering processes to a semi-liquid condition, mixing the same with infusorial earth, and drying the compound thus formed, substantially in the manner and for the purpose described.

CASSIUS C. PECK.

Witnesses:
L. B. PECK,
H. E. WHITEHOUSE.